April 2, 1946.    J. B. KIRBY    2,397,869

DRIVING MECHANISM

Filed Aug. 25, 1943

INVENTOR
James B. Kirby
BY Evans + McCoy
ATTORNEYS

Patented Apr. 2, 1946

2,397,869

UNITED STATES PATENT OFFICE 2,397,869

DRIVING MECHANISM

James B. Kirby, West Richfield, Ohio

Application August 25, 1943, Serial No. 499,923

17 Claims. (Cl. 192—3.2)

This invention relates to a driving mechanism and has for its object to provide a hydrokinetic driving connection so combined with a clutch as to limit the torque load imposed upon the motor at speeds below operating speeds and to provide a direct drive at operating speed.

Various hydrokinetic driving devices have been employed in which the speed of a driven mechanism decreases or increases as the torque load is increased or decreased and such drives are highly advantageous in that they limit the load on the motor in starting and protect the motor against sudden increases in torque. However, such drives, because of the automatically induced speed variations, are not suitable for machines that require a constant speed of operation. Furthermore, even where the torque is fairly constant, there is a loss of speed at all times due to slippage, such slippage being an inherent characteristic of hydrokinetic driving devices.

It is an object of the present invention to provide a hydraulic coupling that is operative during starting and while the machine is being brought up to speed combined with a clutch which is automatically shifted when the mechanism attains a certain speed to provide a direct drive between the motor and the machine.

A further object of the invention is to utilize the pressure generated by centrifugal force in the liquid of an hydraulic coupling to actuate a clutch.

A further object is to provide an hydraulic coupling with a resiliently expansible housing that is adapted to serve as a clutch actuator.

More specifically, it is an object of my invention to provide a torque-transmitting device including a fluid coupling and a friction clutch that is normally disengaged but which is actuated by fluid pressure developed in the coupling.

A further object of the invention is to provide a combined hydraulic coupling and clutch which is of simple, compact and economical design.

With the above and other objects in view, the invention may be said to comprise the device as illustrated in the accompanying drawing hereinafter described and particularly set forth in the appended claims, together with such variations and modifications thereof as will be apparent to one skilled in the art to which the invention pertains.

Reference should be had to the accompanying drawing forming a part of this specification in which.

Figure 2:
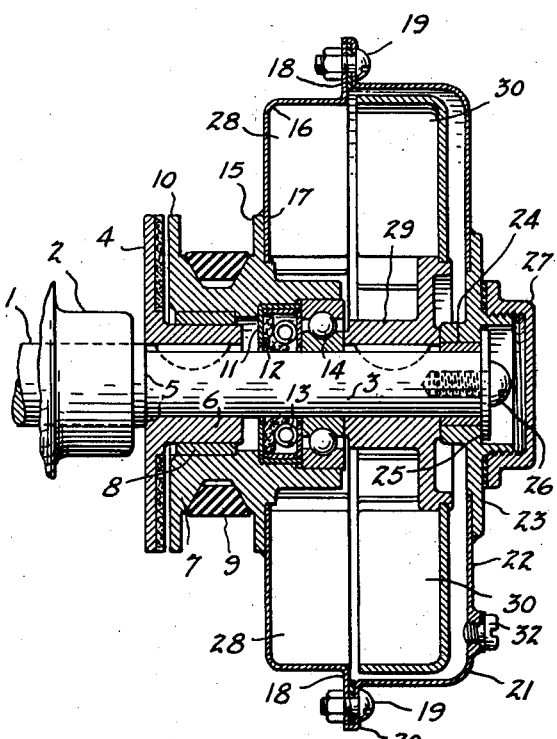
Fig. 2 is a section taken on the lines indicated at 2—2, Figure 1.

Referring to the accompanying drawing, the combined coupling and clutch of the present invention is shown applied to a driving shaft 1 which may be the shaft of an electric motor, a fragment of which is shown at 2 in Figure 2. The driving shaft 1 has a reduced end portion 3 and mounted upon the end portion 3 of the shaft there is a friction disc 4 which is keyed to the shaft and positioned against a shoulder 5 at the inner end of the reduced portion 3.

The disc 4 has a hub 6 upon which a driven member in the form of a combined pulley and runner hub member 7 is rotatably and slidably mounted. An oilless bearing 8 may be interposed between the hubs 6 and 7, the member 7 having an external groove shaped to receive V-belt 9 which may be employed to drive machinery not shown. The combined hub and pulley member 7 carries a friction disc 10 at its inner end closely adjacent to and adapted for engagement with the friction disc 4 keyed to the driving shaft. Surrounding the shaft 1 within the combined pulley and hub member 7, there is a sealing device of any suitable type. As herein shown, an oil sealing ring 11 is provided that has a rubber ring 12 engaging the reduced portion 3 of the shaft 1 and a spring ring 13 that surrounds and presses the ring 12 against the shaft. Outwardly of the oil sealing ring 11, a ball bearing 14 is interposed between the member 7 and the reduced portion 3 of the shaft. The combined pulley and hub member 7 is axially movable to engage the disc 10 with the friction disc 4 or to disengage the same, the bearing 8 being slidable on the hub 6 and the bearing 14 on the driving shaft. The member 7 has a peripheral flange 15 on the outer side of the pulley groove and an inner housing section 16 is attached to the flange 15, the housing section 16 having a vertical wall 17 with a central opening that receives the member 7 and a peripheral flange 18 connected by clamping bolts 19 to the peripheral flange 20 of an outer housing section 21. The outer housing section 21 has an outer end wall 22 that is attached to a hub 23 that is rotatably mounted upon the outer end of the driving shaft, an oilless bearing 24 being interposed between the hub 23 and the shaft, and the hub 23 being held in place on the shaft by means of a washer 25 screwed against the end of the shaft by means of a screw 26. A cap 27 screwed on the hub member 23 closes the shaft receiving opening of the hub member and provides a seal against escape of liquid from the housing.

A series of vanes 28 are attached to the inner housing section 16 internally thereof so that the housing is adapted to serve as the runner of an hydraulic coupling interposed between the pulley 7 and shaft 1. The driving shaft 1 has an impeller 29 keyed thereto within the housing and this impeller carries a series of vanes 30 which are positioned within the outer section 21 of the housing alongside of vanes 28 that are attached to the housing; the vanes 28 and 30 may all be flat and disposed radially and, as is customary, there may be a slight difference in the number of vanes on the runner and on the impeller. The housing is fluid-tight and is preferably filled with liquid except for sufficient space to allow for expansion due to heat, suitable means such as a filling plug 32 being provided to permit liquid to be introduced therein. The housing sections 16 and 21 are preferably in the form of relatively thin sheet metal stampings that have such resiliency that the housing will expand axially when subjected to internal fluid pressure and contract to normal size when relieved of pressure.

The housing with the vanes 28 attached thereto forms a runner rotating with the pulley member 7. Rotation is imparted to this runner by the action of the body of liquid within the housing when motion is imparted to this liquid by the impeller 29. When the impeller 29 is rotated, the body of liquid within the housing is given a rotary motion around the axis in the shaft that imposes an outward pressure upon the liquid due to centrifugal force. The kinetic energy imparted to the liquid by the impeller exerts a pressure on the vanes 28 that imparts rotation to the housing and to the pulley member 7. When the motor is started into operation, the driving pulley is rotated with gradually increasing speed until it reaches a speed near the maximum speed that the hydraulic coupling is capable of transmitting. The pressure developed in the body of the liquid within the housing due to centrifugal force when the housing approaches the maximum speed that the hydraulic coupling is capable of imparting to it is sufficient to expand the inner wall 17 of the housing and slide the pulley member 7 on the hub 6 until the friction disc 10 engages with the friction disc 4 to establish a direct driving connection between the shaft 1 and the pulley member 7. The body of liquid within the housing thus becomes a speed-responsive medium by which an axial movement is imparted to a movable clutch element to establish a direct driving connection between the driving shaft and the driven mechanism. So long as the shaft is driven at full speed, the fluid pressure within the housing is somewhat greater than that required to shift the clutch and is sufficient to hold the clutch elements in engagement. However, if the speed of the driving shaft is reduced from overload or other cause, the fluid pressure within the housing will be reduced and the housing will contract axially due to its resiliency and disengage the clutch elements.

The hydraulic coupling prevents imposition of an excessive load upon the driving motor while the machine driven by the motor is being brought up to speed and the automatic clutch serves to provide a direct driving connection between the motor and the machine after the machine has been brought up to speed.

Figure 3:
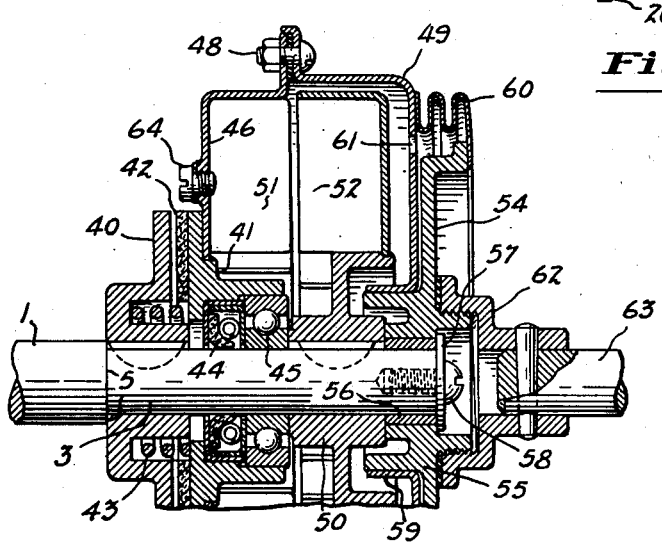
Fig. 3 is a fragmentary axial section showing a slightly modified form of the invention suitable for use with larger motors.

In Figure 3 of the drawing a slightly modified embodiment of the invention is shown. In this modification, the disc 4 is replaced by a friction disc 40 and the combined runner hub and pulley 7 is replaced by runner hub 41. The hub 41 has a friction shoe 42 for engagement with the friction disc 40 and a coil spring 43 interposed between the disc 40 and the hub 41 serves to normally hold the clutch elements out of engagement. The hub 41 has a sealing ring 44 and a ball bearing 45 that correspond with the sealing ring 11 and bearing 14 in the modification first described. An inner housing section 46 is attached to the hub member 41 and the section 46 is attached by means of bolts 48 to an outer section 49.

Sections 46 and 49 of the housing are similar to the sections 16 and 21 in the modification first described except that the resiliency of these sections is not depended upon to actuate the movable clutch elements. An impeller 50 is attached to the driving shaft 1 within the housing and vanes 51 and 52 attached to the housing and to the impeller provide means by which motion may be imparted to the housing upon rotation of the shaft 1 and impeller 50. A disc 54 is mounted at the outer end of the drive shaft 1 and is provided with a hub portion 55 which receives the shaft. A suitable oilless bearing 56 may be interposed between the hub 55 and shaft 1. The disc 54 is retained on the shaft by means of a washer 57 secured against the end of the shaft by means of a screw 58. The outer section 49 of the housing has an internal flange 59 slidably mounted on the hub 55 and the section 59 is connected to the periphery of the disc 54 by means of a Sylphon 60, the section 59 being provided with a series of holes 61 to permit free flow of liquid from the interior of the housing into the space between the disc 54 and the housing that is closed by the Sylphon 60. A collar 62 screwed onto the hub 55 has a driven shaft 63 secured therein in axial alignment to the shaft 1. The housing, as in the first modification, is substantially filled with liquid and may be provided with filling plug 64 to permit the liquid to be introduced into it.

Figure 1:
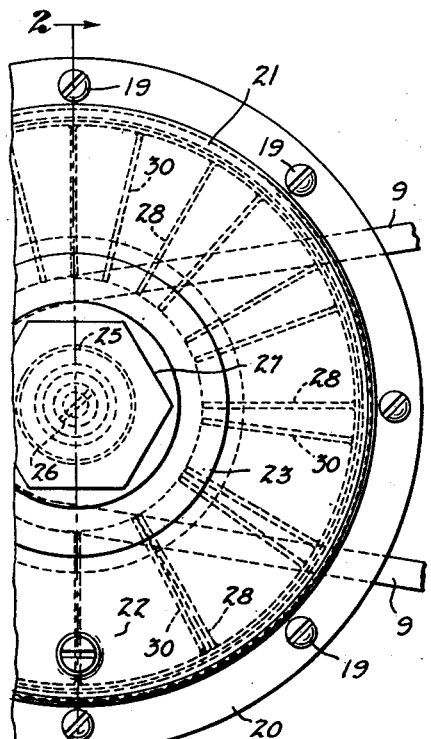
Figure 1 is a fragmentary end elevation of a device embodying the invention that is suitable for use with fractional horsepower motors.

The operation of the device shown in Figure 3 is similar to that of the device shown in Figures 1 and 2, the housing in this case being expanded axially by reason of the resiliency of the Sylphon 60 instead of by reason of the resiliency of the walls of the housing. When the housing and driven shaft approach the maximum speed at which they can be driven through the hydraulic coupling, the centrifugal pressure within the housing and Sylphon becomes great enough to expand the Sylphon and slide the housing axially on the shaft 1 against the action of the spring 43 and to engage the clutch elements 40 and 42 whereupon the shaft 63 will be driven direct from shaft 1 through the friction clutch at a speed somewhat higher than that imparted to it through the hydraulic coupling. This speed of rotation will maintain a liquid pressure within the housing sufficient to hold the clutch elements in driving engagement so that shaft 63 will be continuously driven at the speed of shaft 1.

In both modifications of the invention herein described the pressure of the liquid within the housing is due to centrifugal force and is a function of the speed of rotation of the runner housing, and the runner housing, axially expansible when subjected to a predetermined internal pressure, provides means automatically responsive to the speed of rotation for establishing a direct driving connection between a driving member such as the shaft 1 and a driven member such as the pulley 7 or the shaft 63 whenever the driven member attains a predetermined speed of rotation.

It is to be understood, however, that as is generally true of driving mechanisms, the driving device of the present invention may be reversed, if desired, so that power is transmitted from the driven member to the driving member, in which case the pulley 7 or the shaft 63 becomes the driving member and the shaft 1 the driven member.

It is to be understood that the modifications herein shown and described are merely illustrative and that numerous and widely variant embodiments thereof will readily occur to persons skilled in the art.

What I claim is:

1. In a driving mechanism, a rotatable driving member, a rotatable driven member, an hydraulic coupling comprising a rotatable liquid-retaining housing and an impeller and a runner, connected to the driving and driven members, respectively, said housing being expansible by internal fluid pressure generated therein during rotation, said impeller and runner being coaxially mounted within the housing, one rotating with the housing and the other independently thereof, and means controlled by the expansible housing for clutching said driving member to said driven member.

2. In a driving mechanism, a rotatable driving member, a rotatable driven member, an hydraulic coupling comprising a rotatable liquid-retaining housing and an impeller and a runner connected to the driving and driven members, respectively, said housing being expansible and having a portion movable axially when subjected to internal pressure, said impeller and runner being coaxially mounted within the housing, one rotating with the housing and the other independently thereof, friction clutch elements connected one to said driving member and the other to said driven member, one of said clutch elements being movable with said axially movable portion of the housing and into and out of engagement with the other clutch element.

3. In a driving mechanism, a rotatable driving member, a rotatable driven member, an hydraulic coupling comprising a rotatable liquid-retaining housing and an impeller and a runner, connected to the driving and driven members, respectively, said impeller and runner being coaxially mounted within the housing, one rotating with the housing and the other independently thereof, and means outside the housing and controlled by the pressure generated in the liquid within said housing during rotation for clutching the driving member to the driven member.

4. In a driving mechanism, a rotatable driving member, a rotatable driven member, an hydraulic coupling comprising a rotatable liquid-retaining housing and an impeller and a runner, connected to the driving and driven members, respectively, said impeller and runner being coaxially mounted within the housing, one rotating with the housing and the other independently thereof, friction clutch elements outside the housing and connected one to said driving member and the other to said driven member, and means controlled by the pressure generated in the liquid within said housing during rotation for engaging and disengaging said clutch elements.

5. In a driving mechanism, a drive shaft, a driven member coaxial with the shaft, an impeller attached to said shaft, a runner attached to said driven member, a liquid-retaining housing enclosing said impeller and runner, and means outside the housing and controlled by the pressure generated in the liquid within the housing during rotation for clutching said driven member to said drive shaft.

6. In a driving mechanism, a drive shaft, a driven member coaxial with the shaft, an impeller attached to said shaft, a runner attached to said driven member, a liquid-retaining housing enclosing said impeller and runner and attached to the runner, clutch elements attached to the drive shaft and to said housing exteriorly thereof, respectively, and means controlled by the pressure generated in the liquid within the housing during rotation for engaging and disengaging said clutch elements.

7. In a driving mechanism, a drive shaft, a driven member coaxial with the shaft, an impeller attached to said shaft, a runner attached to said driven member, a liquid-retaining housing attached to the runner and enclosing the runner and impeller, and means outside the housing and controlled by the pressure generated in the liquid within the housing during rotation for clutching said housing to said drive shaft.

8. In a driving mechanism, a drive shaft, an impeller fixed to said shaft, a runner rotatable on said shaft, a fluid-tight housing having a body of liquid therein, said housing being fixed to the runner and enclosing said impeller and runner, said housing being resiliently expansible when subjected to internal fluid pressure, and means controlled by the expansible housing for clutching said drive shaft to said runner.

9. In a driving mechanism, a drive shaft, an axially expansible fluid-tight housing rotatable on said shaft and having a body of liquid therein, said housing having one side wall secured against axial movement upon said shaft and its opposite side wall resiliently supported and movable axially on said shaft and away from the opposite side wall by fluid pressure within the housing, vanes attached to said housing internally thereof, an impeller fixed to the shaft within the housing, and opposed friction clutch elements attached to the movable wall of said housing and to said shaft, respectively.

10. In a driving mechanism, a drive shaft, an axially expansible fluid-tight housing rotatable on said shaft and having a body of liquid therein, said housing having one side wall secured against axial movement upon said shaft and its opposite side wall resiliently supported and movable axially on said shaft and away from the opposite side wall by fluid pressure within the housing, vanes attached to said housing internally thereof, an impeller fixed to the shaft within the housing, opposed friction clutch elements attached to the movable wall of said housing and to said shaft, respectively, and a drive pulley attached to said housing.

11. In a driving mechanism, a drive shaft, an axially expansible fluid-tight housing rotatable on said shaft and having a body of liquid therein, said housing having one side wall secured against axial movement upon said shaft and its opposite side wall resiliently supported and movable axially on said shaft and away from the opposite side wall by fluid pressure within the housing, vanes attached to said housing internally thereof, an impeller fixed to the shaft within the housing, opposed friction clutch elements attached to the movable wall of said housing and to said shaft, respectively, and a shaft coaxial with the drive shaft and attached to said housing.

12. A torque-transmitting device comprising a driving member, a driven member, an hydraulic coupling forming a driving connection between said members and including a rotatable liquid-retaining housing, a second driving connection between said members outside said housing, and means controlled by the pressure in said housing generated by centrifugal force during rotation of the housing for rendering said second driving connection operative or inoperative.

13. A torque-transmitting device comprising an hydraulic coupling having a rotatable driving element, a rotatable driven element and a liquid-retaining housing connected to one of said elements to rotate therewith, clutch elements outside said housing and connected, one to the driving element and one to the driven element and mounted for relative movement, one into and out of engagement with the other, and means controlled by the pressure of the liquid in the housing generated by centrifugal force during rotation of the housing for engaging and disengaging said clutch elements.

14. In a driving mechanism, a drive shaft, an impeller attached to the shaft, a friction clutch element attached to the shaft and spaced from the impeller, a pulley slidable on the shaft between said clutch element and said impeller, a friction clutch element attached to the pulley and engageable with the clutch element on the shaft, a runner rotatable on said shaft adjacent the impeller, and a resiliently expansible fluid tight liquid containing housing rotatable with the runner and enclosing said impeller and runner, said housing having a wall attached to said pulley that is axially movable toward the clutch member on said shaft when subjected to fluid pressure generated in said housing during rotation thereof to engage said clutch elements.

15. In a driving mechanism, a drive shaft, an impeller attached to said shaft adjacent an end thereof, a friction clutch element attached to the shaft inwardly of said impeller, a driven shaft adjacent said end of the drive shaft, a runner rotatable on said drive shaft, a fluid tight liquid containing housing enclosing said impeller and runner and rotatable with said runner, said housing having an outer wall attached to said driven shaft and an inner wall connected to said outer wall by an axially expanding Sylphon, and disposed between said clutch element and said impeller, said outer wall being movable toward said clutch element when subjected to fluid pressure generated in the housing during rotation thereof, and a friction clutch element carried by said inner wall and engageable with the clutch element attached to said shaft.

16. A torque transmitting device comprising axially alined driving and driven shafts, a clutch element attached to one of said shafts, an annular laterally expansible liquid retaining housing having the central portion of one of its side walls fixed to the other of said shafts and its opposite side wall movable axially toward said clutch element when subjected to internal fluid pressure generated by centrifugal force in said chamber, and a clutch element attached to the movable side wall externally thereof and engageable with said first mentioned clutch element.

17. A torque transmitting device comprising axially alined driving and driven shafts, an annular laterally expansible liquid retaining housing having one of its side walls attached centrally to one of said shafts and its opposite side wall free to move axially away from said attached wall when subjected to internal fluid pressure generated by centrifugal force in said chamber, a friction clutch element attached to the other of said shafts, and spaced axially from said movable wall, and a friction clutch element attached to said movable wall externally thereof and engageable with the first mentioned friction clutch element.

JAMES B. KIRBY.